(12) United States Patent
Post

(10) Patent No.: US 7,478,598 B2
(45) Date of Patent: Jan. 20, 2009

(54) OSCILLATION DAMPING MEANS FOR MAGNETICALLY LEVITATED SYSTEMS

(75) Inventor: Richard F. Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 228 days.

(21) Appl. No.: 11/637,551

(22) Filed: Dec. 11, 2006

(65) Prior Publication Data

US 2007/0131134 A1   Jun. 14, 2007

Related U.S. Application Data

(60) Provisional application No. 60/749,157, filed on Dec. 9, 2005.

(51) Int. Cl.
*B60L 13/00* (2006.01)

(52) U.S. Cl. ............... 104/281; 104/282; 104/286; 335/306

(58) Field of Classification Search ......... 104/281–286; 310/12–13; 335/306
See application file for complete search history.

(56) References Cited

U.S. PATENT DOCUMENTS

| | | | |
|---|---|---|---|
| 3,871,301 A | 3/1975 | Kolm et al. | |
| 4,259,908 A * | 4/1981 | Feistkorn et al. | 104/281 |
| 4,454,820 A * | 6/1984 | Raschbichler | 104/281 |
| 4,585,282 A | 4/1986 | Bosley | |
| 4,969,401 A * | 11/1990 | Kolm | 104/284 |
| 5,319,670 A | 6/1994 | Fox | |
| 5,628,052 A | 5/1997 | DeSantis et al. | |
| 5,628,252 A | 5/1997 | Kuznetsov | |
| 5,722,326 A * | 3/1998 | Post | 104/281 |
| 6,633,217 B2 | 10/2003 | Post | |
| 6,664,880 B2 | 12/2003 | Post | |
| 6,684,794 B2 * | 2/2004 | Fiske et al. | 104/281 |
| 6,983,701 B2 * | 1/2006 | Thornton et al. | 104/282 |

FOREIGN PATENT DOCUMENTS

DE   2506388 A1   8/1976

* cited by examiner

*Primary Examiner*—Ramon M Barrera
(74) *Attorney, Agent, or Firm*—Michael C. Staggs; John H. Lee

(57) ABSTRACT

The present invention presents a novel system and method of damping rolling, pitching, or yawing motions, or longitudinal oscillations superposed on their normal forward or backward velocity of a moving levitated system.

23 Claims, 6 Drawing Sheets

OSCILLATION DAMPING MEANS FOR MAGNETICALLY LEVITATED SYSTEMS

RELATED APPLICATION

This application claims priority from U.S. Provisional Patent Application No. 60/749,157, entitled "OSCILLATION DAMPING MEANS FOR MAGNETICALLY LEVITATED SYSTEMS," filed on Dec. 9, 2005, and is incorporated by reference in its entirety.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to magnetic levitation systems for moving objects, and more specifically, to a means for damping deleterious oscillations involving magnetic levitation train systems.

2. Description of Related Art

Halbach arrays, invented by Klaus Halbach in the 1980s for use in particle accelerators, represent a maximally efficient way to arrange permanent-magnet material when it is desired to produce a strong periodic magnetic field adjacent to the array. The beauty of the concept is that the effect of the cross-magnetized magnet bars in the array is to enhance the periodic magnetic field at the front face of the array, while canceling it on the back face of the array. Not only is the field enhanced, but analysis shows that in a long array the horizontal and vertical components are nearly purely sinusoidal in their spatial variation, with negligible higher spatial harmonics. If the Halbach array is then fabricated from high-field permanent-magnet material, such as NdFeB, peak fields near the front face of the array of order 1.0 Tesla are possible.

In the Inductrack maglev system, Halbach arrays are used, located below the train car. When in motion the magnetic field of these arrays then induces currents in a special "track" made up of close-packed shorted circuits. Analysis has shown that the combination of the three elements, Halbach arrays, NdFeB magnet material, and close-packed circuits in the track result in the possibility of achieving levitation forces in excess of 40 metric tons per square meter of levitating magnets, corresponding to magnet weights of only a few percent of the levitated weight.

Background information for maglev systems can be found in U.S. Pat. No. 5,722,326, titled "Magnetic Levitation System For Moving Objects", U.S. Pat. No. 6,663,217 B2, titled "Inductrack Magnet Configuration", and U.S. Pat. No. 6,664,880, titled "Inductrack Magnet Configuration", all to Richard F. Post, all assigned to the assignee of the present invention, and all of which are incorporated herein by reference in its entirety.

However, such maglev systems as disclosed in the incorporated applications often produce deleterious resonant frequency oscillations of at least about 1 Hz in all principal modes of motion when in operation. These oscillations are describable as rolling, pitching, or yawing motions, or longitudinal oscillations superposed on their normal forward or backward velocity. These oscillations can be stimulated by imperfections in the "track," by the drive system, or by inherent instability arising from some special characteristic of the levitation system itself. Typically the levitation system is not capable, of itself, to damp out these oscillations and other means is therefore required.

A general rule for achieving effective damping of driven oscillations (e.g., rolling, pitching, or yawing motions, or longitudinal oscillations superposed on their normal forward or backward velocity of a moving levitated system) is that the kinetic energy associated with the oscillations be dissipated in the stationary frame, that is, in the track and/or its supporting structure. While in some cases damping can be effected in the moving frame (i.e., in the frame of the moving object), this type of damping is not only characteristically less effective, but also may be the driving source for instabilities of the "dissipative" type, a type encountered in other contexts, such as in bearing-supported rotating systems.

Accordingly, a need exists for damping the induced oscillations at these slow frequencies in such maglev systems. The present invention is directed to such an invention.

SUMMARY OF THE INVENTION

The present invention is directed to a damping system for a magnet rail configuration that includes one or more pair of Halbach arrays magnetically and structurally connected together and a track circuit configured between the one or more pair of Halbach arrays. The track circuit can be configured with a plurality of predetermined transverse cuts to periodically separate the track circuit at desired intervals so as to produce a plurality of short tracks. Form such a configuration, one or more dampers can be operably coupled at each of the short tracks, wherein each damper often includes: a support shaft; a fixed friction disc coupled to the support shaft; and a movable friction disc coupled to the support shaft and additionally coupled to an inner edge of the short track.

Another aspect of the present invention is directed to a method for suppressing induced oscillations of a magnet rail system, including; positioning a track circuit between one or more pair of Halbach arrays, wherein the track circuit further includes a plurality of predetermined transverse cuts to periodically separate the track circuit at desired intervals so as to produce a plurality of short tracks; coupling one or more dampers at each of the short tracks so as to suppress unwanted vertical, horizontal, and longitudinal induced oscillations in the magnet rail system, wherein each damper can include: a support shaft; a fixed friction disc coupled to the support shaft; and a movable friction disc coupled to the support shaft and additionally coupled to an inner edge of the short track.

Accordingly, the present system and method provides desired configurations to dampen undesired rolling, pitching, or yawing motions, or longitudinal oscillations superposed on their normal forward or backward velocity of a moving levitated system. Such a system and method is beneficial for urban or high-speed transportation systems, such as, but not limited to, magnetically levitated rocket launching systems or in other government-owned maglev transportation systems, magnetically levitated "people mover" systems and/or magnetically levitated capsules for high-speed transportation of "high-value" freight.

DETAILED DESCRIPTION OF THE INVENTION

Figure 1:
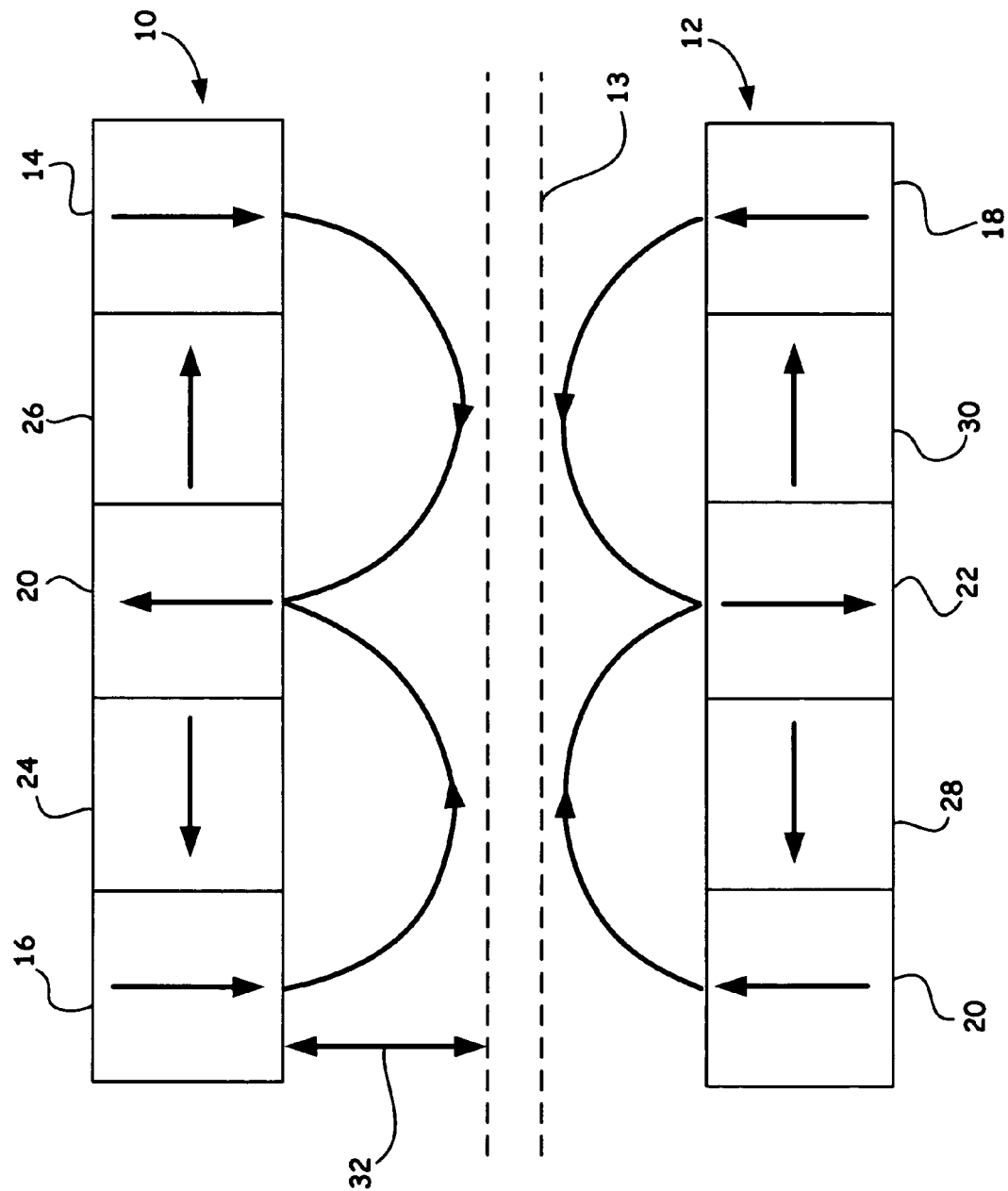
FIG. 1 shows twin Halbach arrays with vertical field cancellation according to the present invention.

Referring now to the following detailed information, and to incorporated materials; a detailed description of the invention, including specific embodiments, is presented.

Unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

Moreover, in the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component, may generally be used individually or in combination with one another, unless implicitly or explicitly understood or stated otherwise. Additionally, it will be understood that any list of such candidates or alternatives, is merely illustrative, not limiting, unless implicitly or explicitly understood or stated otherwise.

Finally, various terms used herein are described to facilitate an understanding of the invention. It is understood that a corresponding description of these various terms applies to corresponding linguistic or grammatical variations or forms of these various terms. It will also be understood that the invention is not limited to the terminology used herein, or the descriptions thereof, for the description of particular embodiments. Merely by way of example, the invention is not limited to particular train system designs or usages, unless implicitly or explicitly understood or stated otherwise, as such may vary.

General Description

The present invention provides and discloses beneficial damping embodiments that can be adapted with, but not necessarily limited to, the systems and methods described in U.S. Pat. No. 6,633,217 and U.S. Pat. No. 6,664,880, both titled "Inductrack Magnet Configuration", incorporated herein by reference in their entirety. Accordingly, the present invention is directed to a system and method to suppress unwanted driven oscillations, such as, for example, rolling, pitching, or yawing motions, or longitudinal oscillations superposed on their normal forward or backward velocity of a moving levitated system.

Such preferred systems, as discussed in the aforementioned applications, include coupled upper and lower Halbach arrays connected on each side of the train car. Between each array pair there is a cantilevered track of windings in the form of a planar array of conductors shorted together at their ends (beyond the ends of the dual Halbach arrays). (In one embodiment, the tracks are tilted from horizontal to provide centering.) The Halbach arrays of the dual assembly are positioned with respect to each other so that the vertical components of their fields tend to cancel at the mid-plane between them, while their horizontal components add. Thus, if the two arrays are equal in width and thickness, when the moving Halbach arrays are located equally above and below the track, no current is induced in the windings (and no force is exerted), however, if they move (as a unit) either up or down with respect to the track, a restoring force is exerted. In operation, the midplane between the magnets is configured to lie below the midplane of the track conductor, so that a net levitation force results in equilibrium with the downward force of gravity.

As also discussed in the aforementioned incorporated applications, the levitating (horizontal) component of the field is approximately doubled relative to a single array, leading to a factor of two decrease in the current required in the track conductors for a given levitation force, corresponding to a potential factor-of-four reduction in the drag power losses. The result is that the Lift-to-Drag (L/D) ratio at operating loads can be increased by increasing the area of the magnets. This increase in area decreases the downward displacement required to levitate a given weight, and thus decreases the current required for levitation.

Specific Description

Turning now to the drawings, FIG. 1 schematically illustrates an example Inductrack system, as similarly described in the above incorporated allowed applications, wherein the Halbach arrays 10, 12 are configured such that the horizontal components of the fields add while the vertical components cancel. Specifically, in the example arrays of FIG. 1, the vertical field components (all components are denoted by arrows) shown in two outer poles 14, 16 of array 10 and the vertical field components of two outer poles 18, 20 of array 12 are pointed towards the mid-plane between the arrays and the vertical field component of center pole 20 of array 10 and vertical field component of center pole 22 of array 12 are pointed away from the mid-plane. Horizontal field components of poles 24 and 26 of array 10 and horizontal field components of poles 28 and 30 of array 12 are configured to point toward the center pole of the respective array. With such a magnet configuration, no currents flow and there is no levitation when a track circuit array (shown positioned at a configured vertical null field 13, as shown by the referenced dashed line in FIG. 1) is centered between the two Halbach arrays. Only a displacement (e.g., a horizontal displacement or a vertical displacement, as shown in the schematic representation of FIG. 1 by the double arrows 32) can result in exerted restoring forces. A beneficial aspect of such a system is that it provides a centering action, one that can be employed either vertically or horizontally.

The track circuit itself can include, but is not limited to, a cantilevered track either configured as a "ladder" type, employing encapsulated litz-wire cables (a track employing many strands of insulated wire that are specially transposed so that each wire visits the inner and outer parts of the cable equally), or of the "laminated" variety, as discussed in incorporated by reference U.S. Pat. No. 6,664,880, a configuration which often employs a laminate arranged with slotted copper or aluminum sheets, bonded together and mechanically reinforced so as to better support the levitation load.

Figure 2:
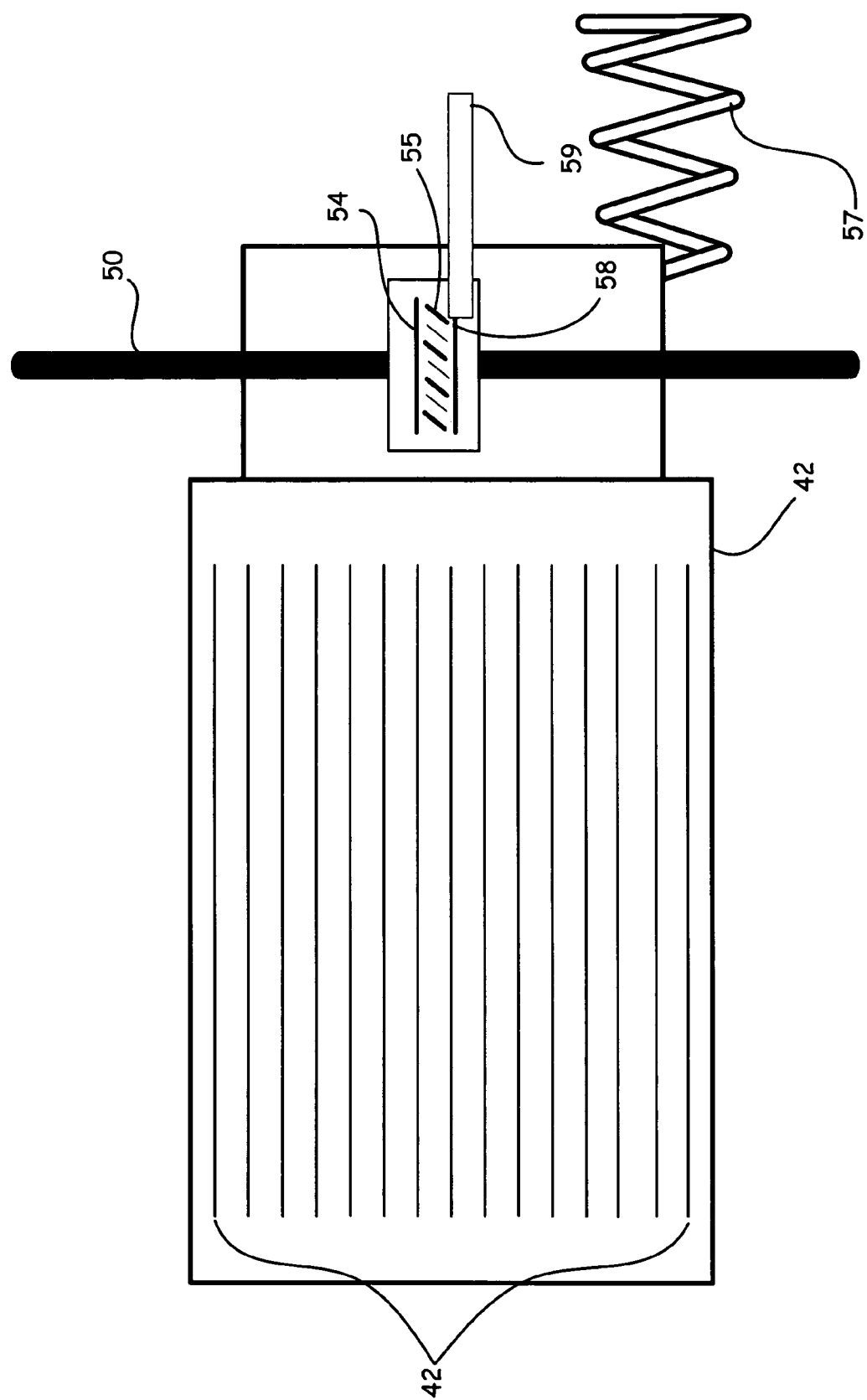
FIG. 2 shows a top view of a damping configuration of the present invention.

FIG. 2 illustrates a basic top view schematic of an example damper section 42 of the present invention, configured from a laminated "ladder" type track embodiment, i.e., a track configured from slotted laminated sheets with insulating bonding material to form an inexpensive and mechanically strong structure, as discussed in incorporated by reference U.S. Pat. No. 5,722,326.

In such a configuration, the damping to suppress measured or calculated oscillations is provided by first making transverse cuts (not shown) in the track so as to periodically separate the track via short sections of track at desired intervals. The rigid supports at the base of these short sections are replaced, as utilized in prior embodiments, by a short horizontal support shaft 50 carrying at least one fixed 54 and one movable friction disc 58, the latter being attached to an inner edge (not shown) of the short section, i.e., the damper arm. A preferred configuration is to space the dampers of the present invention at about at about 10 meters or greater so as to correspond to one-half-wavelength-long sections of induced resonant vertical oscillation frequencies of greater than about 1 Hz (i.e., a spacing so that at nominal running speeds, the dampers of the present invention appears at a rate comparable to induced oscillation frequencies).

Alternatively, a friction-producing "collar," (not shown) to which the damper moving structure is attached, can be arranged in place of friction discs. Another embodiment can include visco-elastic material 55 (shown as diagonal light and dark lines), as utilized in, for example, commercial vibration dampers, between the discs or inside the collar to produce the damping effect. Spring returns (shown generically by the reference numeral 57) might also be used, in order to keep the dampers aligned with the plane of the track when no vehicle is present. Also, the dampers can be provided with mechanical catch (shown generically by the reference numeral 59), such as, for example, a mechanical detent, to prevent their coming in contact with the upper or lower Halbach arrays.

As the train car passes the damper sections it normally "centers" them at the null surface of the vertical field component of the Halbach array, as shown in FIG. 1 by the reference numeral 13. As long as there are no vertical oscillations these dampers do not exert a force on the Halbach arrays. However, if oscillations are present, these damper sections, owing to the high stiffness of the dual Halbach arrays of an Inductrack II system, are displaced either up or down. As a result the friction discs, or an equivalent beneficial embodiment as discussed above, exerts a drag force, always opposite in direction to that of the displacement. This drag force results in energy dissipation, in the form of heat generated at the interface between the stationary and the moving disc (or the friction collar), thereby damping the oscillation.

Calculations show that using weights and levitation stiffnesses appropriate to a full-size vehicle undergoing a vertical oscillatory motion of 0.01 meters (about half of a typical levitation gap), the kinetic energy associated with this motion that needs to be absorbed by the dampers is found to be only a few hundred Joules. Using typical track widths in the calculations, results show that the friction force needed at the outer part of the damper (i.e., that portion lying between the levitation Halbach arrays, is typically less than about 1000 Newtons (less than one percent of the levitated mass). A first written code indicated a substantial damping of the induced deleterious oscillations by dampers of the present invention when configured to be spaced several meters apart along a track for such levitation systems. A second code that included an ad-hoc driving term so as to model the effect of an actual instability as it might be encountered under conceivable circumstances, also indicated that the dampers of the present invention are highly effective in suppressing the oscillation instabilities. It is to be appreciated that more sophisticated computer simulations can be utilized to take into account the details of known secondary suspension systems and other features of an actual vehicle so as to optimize the design of the damper elements as disclosed herein.

Figure 3:
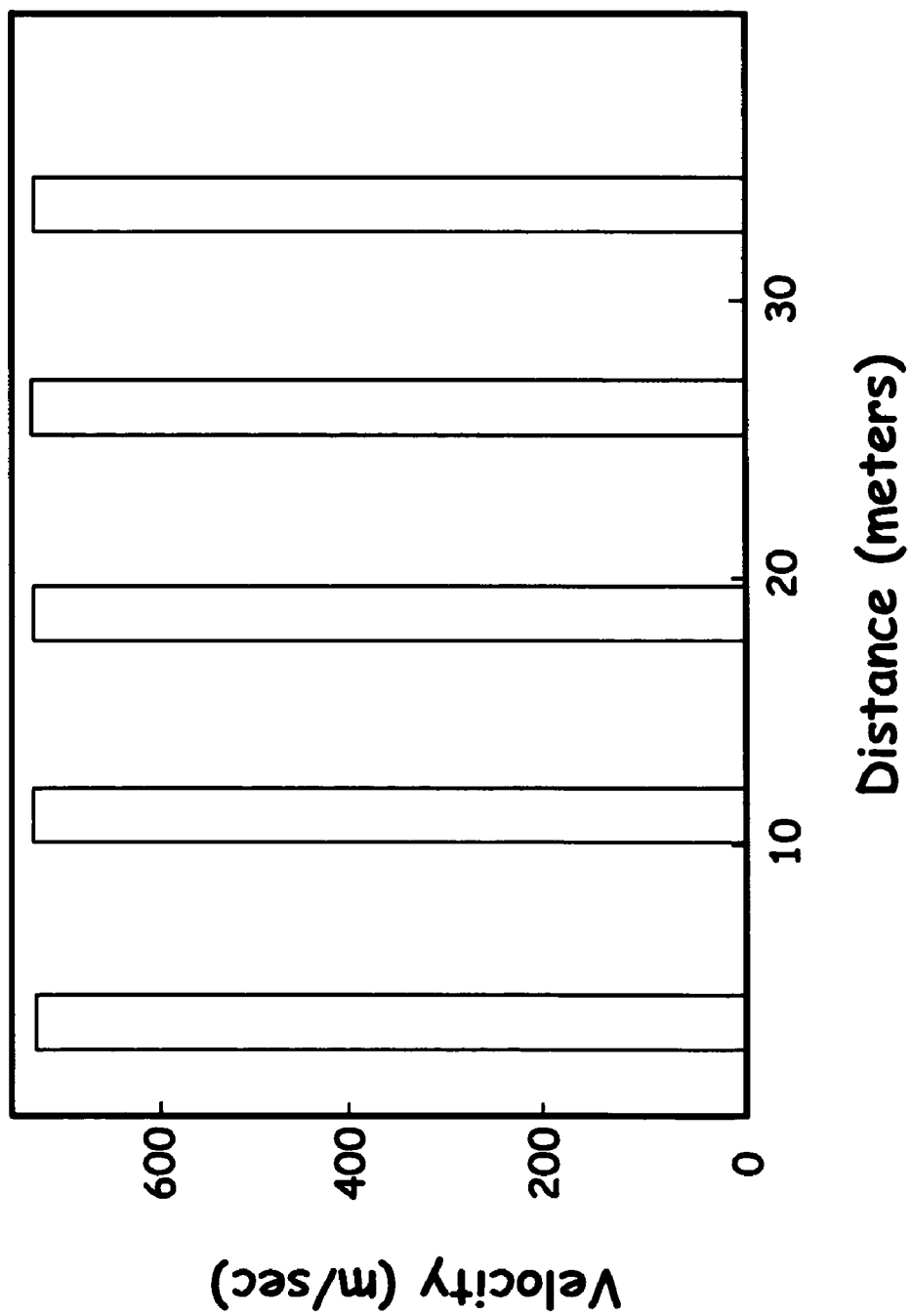
FIG. 3 shows the magnitude of the periodic damping force (750 Newtons) as calculated for a series of dampers that are spaced about 8.0 meters apart.
Figure 4:
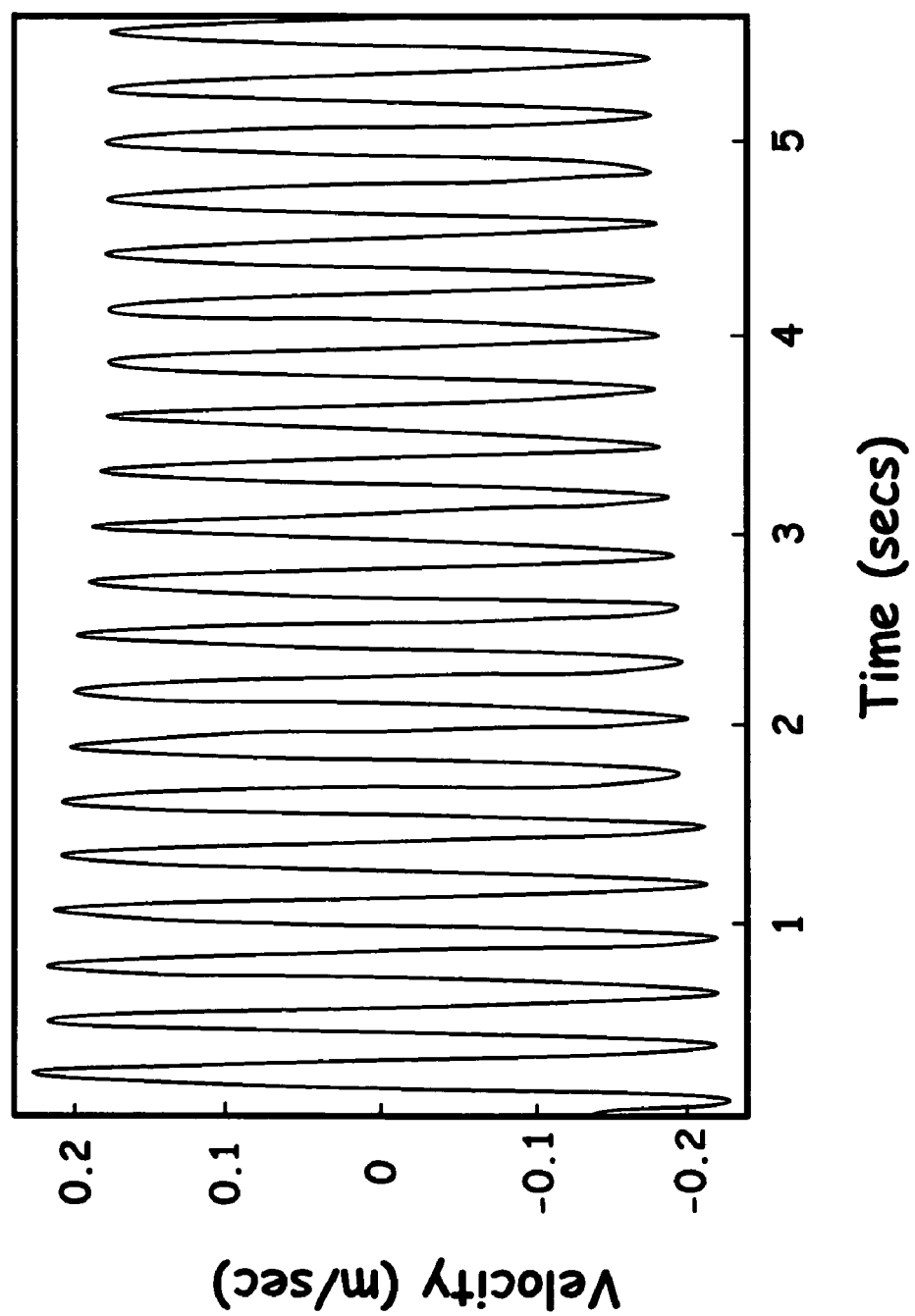
FIG. 4 shows the calculated damping out of the oscillation amplitude vs time for a car moving at 10 meters/second.

FIG. 3 (using the first code) shows the magnitude of the periodic damping force (750 Newtons), as calculated for a series of dampers that are spaced about 8.0 meters apart while FIG. 4 shows the calculated damping out of the oscillation amplitude vs time for a car moving at 10 meters/second.

Figure 5:
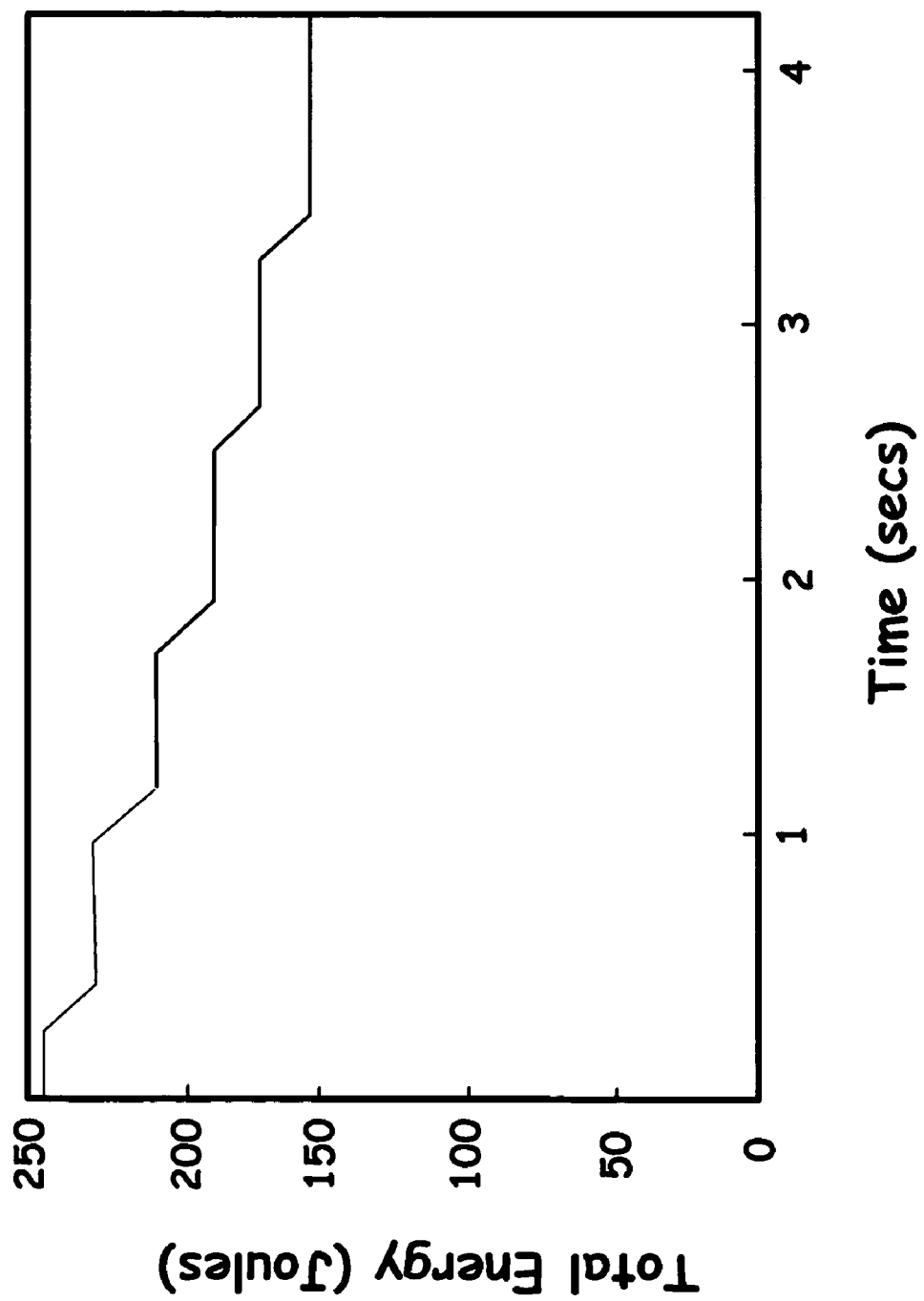
FIG. 5 is a plot of the sum of the kinetic and potential energy of the oscillation illustrating the progressive damping-out of the energy of the oscillations.

FIG. 5 is a plot of the sum of the kinetic and potential energy of the oscillation so as to illustrate the progressive damping-out of the energy of the oscillations for systems discussed herein. In all cases shown, the initial amplitude of the oscillation is ±0.01 meters and the equilibrium levitation gap is 0.025 meters. For this example case, to illustrate the principles of the of the present invention, the weight of the vehicle was taken to be about 10,000 kg and the total stiffness of the Inductrack II Halbach arrays was taken to be about $5 \times 10^6$ Newtons/meter (based on previous calculations). It is to be appreciated that if dampers had been located on both tracks, i.e. on opposite sides of the car, the same amount of vertical oscillation damping can be accomplished with half the force, i.e., at about 375 Newtons While the above calculations relate to simple vertical oscillations of the moving vehicle, it is clear that the same dampers, if located on both tracks in the manner described above can also act to suppress pitching and rolling motions, both of which involve vertical displacements. To suppress sideways or yawing motions requires that the damper assemblies of the present invention, using the same principles as described above, be configured to also respond to transverse motion of the levitated vehicle. In particular, the damper assemblies of the present invention, employing here vertically oriented auxiliary Halbach arrays (e.g., those associated with an electromagnetic driving and braking system for the vehicle), are configured as periodically spaced vertically oriented damper structures of the same types as described above. The general principle involved in all of these examples is to take advantage of the stiff coupling force between the Inductrack II Halbach arrays on the moving vehicle and specially supported short sections of the track coupled to a dissipative element of the present invention, with the damper elements spaced periodically down the system so as to dissipate oscillation frequencies directed primarily at, but not limited to, deleterious induced oscillations produced at nominal running speeds.

While the above description envisages the use of periodically spaced damper sections of greater than about 10 meters incorporated into the track system, in some beneficial embodiments, the support structure of the levitating track can also be modified so that any part of the track, i.e., a dampening structure at any spacing, can respond to its levitated load by a slight upward or downward flexing motion associated with frictional dissipation. The central idea in all cases described herein is that oscillations of the vehicle relative to its equilibrium position can be suppressed by transmitting frictional forces from the "stationary frame" (the track support structure) and the vehicle, using the same Halbach array magnets that are used for levitation (or for propulsion, in the case of transverse oscillations). However, while such embodiments are beneficial, the present invention can be configured with other maglev systems other than the Inductrack, such as the Japanese maglev system using superconducting magnets, wherein separate Halbach arrays can be mounted on the train, interacting with periodically spaced damper assemblies of the general type, as shown in FIG. 2.

As an alternative beneficial damping embodiment with respect to laminated tracks, in the construction of the laminated track, one or more of the upper laminations of the track can be separated from lower laminations by disposing a dissipative layer, such as, but not limited to an elastomeric layer, or a porous elastic medium capable of dissipating energy by expelling air when compressed by the passage of the train car. Code calculations used in the development of the present invention indicated that the amount of compression required to dissipate the oscillation energy is on the order of less than a millimeter, most often fractions of millimeter. Accordingly, the damping structures of the present invention can include such disposed dissipative layers configured into the laminated tracks as discussed above.

Figure 6:
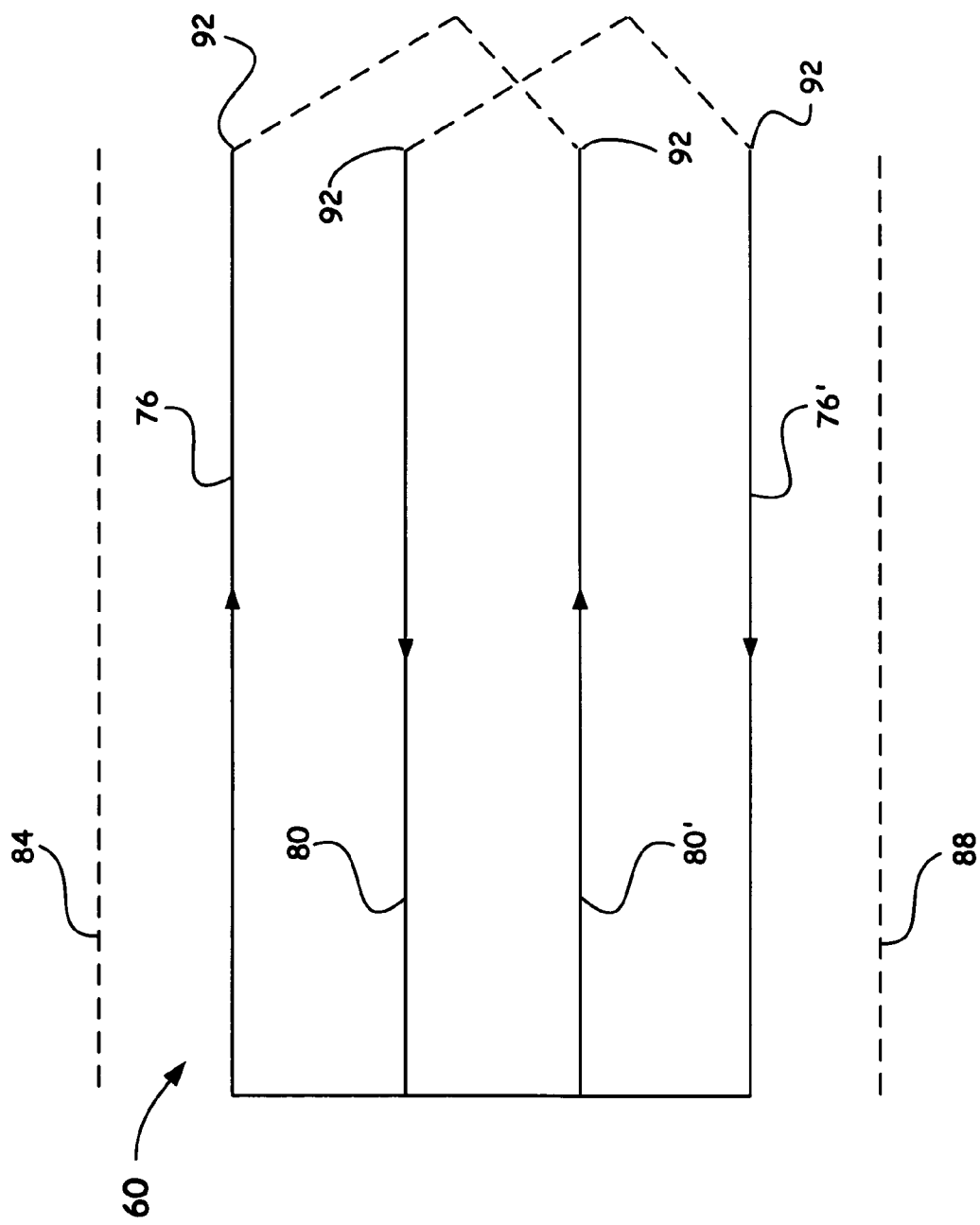
FIG. 6 shows a schematic representation of a passive stabilizer beneficial example design for adaptation with the individual damper elements of the present invention.

FIG. 6 shows a schematic representation of a passive stabilizer beneficial example design for adaptation with the individual damper elements of the present invention. Such a passive destabilizer can be configured either with the laminated track structures, as described herein, or a ladder track made up of encapsulated litz-wire cables, also as briefly described herein, but both of which are more detailed in the aforementioned incorporated by reference applications, i.e., U.S. Pat. No. 6,633,217 and U.S. Pat. No. 6,664,880, both titled "Inductrack Magnet Configuration".

As shown in FIG. 6, a passive stabilizer 60, i.e., a stationary stator winding, can be made up of a close-packed assembly of rectangular loops 76, 76', 80, 80', forming two annuli between an outer 84 and an inner 88 rotating Halback arrays (both schematically shown by dashed lines) of the bearing system. The majority of the windings are connected at their ends 92 so that an induced voltage in the outer loop 76 is in opposing series with that of an inner loop 80. In an equilibrium position, no current flows in these windings. However, a deviation in radial position, either inward or outward, can cause currents to flow so as to produce a restoring force. If the conductors that make up the windings are fabricated from litz wire, the parasitic losses are small. Such an arrangement provides a strong centering force whenever a displacement from the equilibrium occurs. Thus, the passive damper element can be made up of a short stack of such windings, bonded to each other and to a support lever (not shown). Then, as shown and as discussed above with reference to the embodiment of FIG. 2, at the base of such a support lever, friction-discs and restoring springs or equivalent arrangements can be configured to provide the friction damping force and to re-center the stabilizer element after passage of the vehicle.

The foregoing description of the invention has been presented for purposes of illustration and description and is not intended to be exhaustive or to limit the invention to the precise form disclosed. Many modifications and variations are possible in light of the above teaching. The embodiments are chosen and described to best explain the principles of the invention and its practical application to thereby enable others skilled in the art to best use the invention in various embodiments and with various modifications suited to the particular use contemplated. The scope of the invention is to be defined by the following claims.

The invention claimed is:

1. A magnet rail damping system, comprising;
   a track circuit configured between one or more pair of Halbach arrays, wherein said track circuit further comprises a plurality of predetermined transverse cuts to periodically separate said track circuit at desired intervals so as to produce a plurality of short tracks; and
   one or more dampers, wherein each said damper comprises:
   a) a support shaft;
   b) a fixed friction disc coupled to said support shaft; and
   c) a movable friction disc coupled to said support shaft and additionally coupled to an inner edge of said short track.

2. The damping system of claim 1, wherein said dampers are configured with said track circuit so as to each be spaced apart from a respective damper at greater than about 10 meters.

3. The damping system of claim 1, wherein said dampers are configured to dampen induced oscillation frequencies of greater than about 1 Hz.

4. The damping system of claim 1, wherein said dampers further comprise visco-elastic material disposed within said fixed friction disc and said movable friction disc.

5. The damping system of claim 1, wherein a stationary stator winding is operably coupled to said friction discs so as to provide a restoring force.

6. The damping system of claim 5, wherein said stationary winding comprises litz wire.

7. The damping system of claim 1, wherein said track circuit comprises a ladder track configuration or a laminated track configuration.

8. The damping system of claim 7, wherein said laminated track configuration comprises a dissipative layer.

9. The damping system of claim 1, wherein a mechanical catch is operably configured to prevent said dampers from coming in to contact with said one or more Halbach arrays.

10. The damping system of claim 1, wherein said damping system suppresses vertical, horizontal, and longitudinal induced oscillations.

11. The damping system of claim 10, wherein said vertical, horizontal, and longitudinal induced oscillations comprises at least one oscillation selected from roll, pitch, and yaw.

12. The damping system of claim 1, wherein a spring return is operably coupled to said dampers so as to keep said dampers aligned with the plane of said track circuit.

13. A method for suppressing induced oscillations of a magnet rail system, comprising;
   positioning a track circuit between one or more pair of Halbach arrays, wherein said track circuit further comprises a plurality of predetermined transverse cuts to periodically separate said track circuit at desired intervals so as to produce a plurality of short tracks;
   coupling one or more dampers at each of said short tracks so as to suppress unwanted vertical, horizontal, and longitudinal induced oscillations in said magnet rail system, wherein each said damper comprises:
   a) a support shaft;
   b) a fixed friction disc coupled to said support shaft; and
   c) a movable friction disc coupled to said support shaft and additionally coupled to an inner edge of said short track.

14. The method of claim 13, further comprising, spacing each of said dampers from a respective damper at greater than about 10 meters.

15. The method of claim 13, further comprising, spacing each of said dampers from a respective damper so as to dampen induced oscillation frequencies of greater than about 1 Hz.

16. The method of claim 13, further comprising, disposing a visco-elastic material within said fixed friction disc and said movable friction disc of each said damper.

17. The method of claim 13, further comprising, operably coupling a stationary stator winding to said friction discs so as to provide a restoring force.

18. The method of claim 17, wherein said stationary winding comprises litz wire.

19. The method of claim 13, further comprising, configuring said track circuit as a ladder track or a laminated track.

20. The method of claim 19, wherein said laminated track comprises a dissipative layer.

21. The method of claim 13, further comprising, operably providing a mechanical catch to prevent said dampers from coming in to contact with said one or more Halbach arrays.

22. The method of claim 13, wherein said unwanted vertical, horizontal, and longitudinal induced oscillations comprises at least one oscillation selected from roll, pitch, and yaw.

23. The method of claim 13, further comprising, operably coupling a spring return to said dampers so as to keep said dampers aligned with the plane of said track circuit.

* * * * *